United States Patent

[11] 3,609,519

| [72] | Inventors | Toshimasa Seki;<br>Shoichi Hayashi; Kazuo Nakagawa; Shuichi Saito; Hiroshi Toyama, all of Tokyo, Japan |
|---|---|---|
| [21] | Appl. No. | 777,746 |
| [22] | Filed | Nov. 21, 1968 |
| [45] | Patented | Sept. 28, 1971 |
| [73] | Assignee | Nihon Denshi Kabushiki Kaisha<br>Tokyo, Japan |
| [32] | Priority | Nov. 22, 1967, Feb. 27, 1968, July 31, 1968, Aug. 31, 1968 |
| [33] | | Japan |
| [31] | | 42/74981, 43/12496, 43/54444 and 43/62519 |

[54] APPARATUS FOR MAINTAINING FIELD FREQUENCY CONTROL IN A GYROMAGNETIC INSTRUMENT
8 Claims, 15 Drawing Figs.

[52] U.S. Cl. .......................................................... 324/0.5
[51] Int. Cl. ........................................................ G01n 27/78
[50] Field of Search ............................................ 324/0.5;
317/123

[56] References Cited
UNITED STATES PATENTS
| 3,388,322 | 6/1968 | Anderson ...................... | 324/0.5 |
| 3,394,300 | 7/1968 | Packard ........................ | 324/0.5 |

*Primary Examiner*—Michael J. Lynch
*Attorney*—Webb, Burden, Robinson & Webb

ABSTRACT: An apparatus for automatically controlling the field/frequency ratio of a gyromagnetic resonance instrument during sample exchanging by automatically switching from the resonance parameters of an internal reference control within the unknown sample to the resonance parameter of an auxiliary control sample positioned within a space vacated by the unknown during exchange wherein the audio frequency, radio frequency or magnetic field are changed to compensate for deviations in the resonance parameter of the reference and control samples.

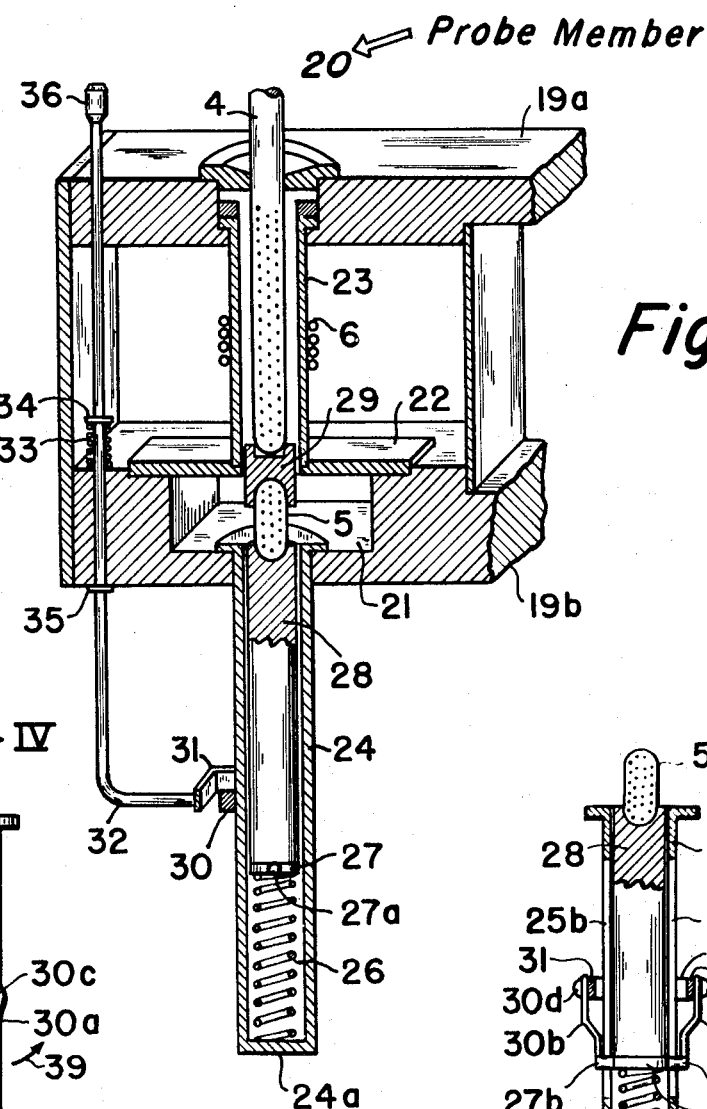
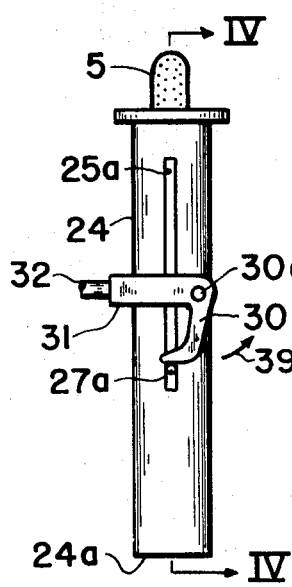
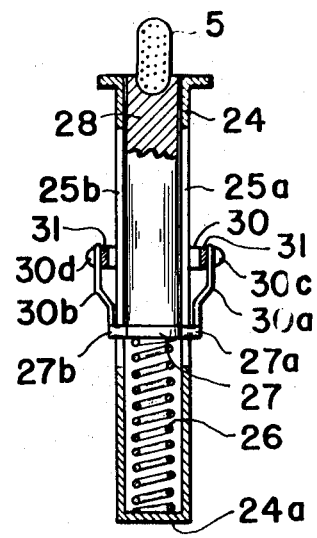

APPARATUS FOR MAINTAINING FIELD FREQUENCY CONTROL IN A GYROMAGNETIC INSTRUMENT

Our invention relates to an improved means for maintaining the resonance parameters of a gyromagnetic resonance apparatus and, in particular, to automatic means for controlling resonance parameters during sample exchange.

It is well known that in high resolution gyromagnetic resonance instruments, the magnetic field produced by the magnetic pole pieces must be maintained in a highly stabilized state. Among the methods for accomplishing stabilization are the one sample nuclear magnetic resonance control method and the two sample NMR control method.

In the one sample NMR control method, one of the resonance signals produced by a sample undergoing analysis or a signal produced by a reference sample contained within the sample undergoing analysis is used for controlling the magnetic field. In the two sample NMR control method, a resonance signal is produced by a sample for controlling the magnetic field by arranging the control sample near the sample being analyzed and within the same magnetic field.

Both methods, however, possess certain defects. In the one sample NMR control method for example, the magnetic field is adequately stabilized during measurement, but adequate stabilization cannot be maintained during sample exchange. Consequently, it is necessary to employ a separate and independent control means for maintaining a sufficiently stabilized magnetic field during sample exchange. This leads to operational complexity and inconvenience.

In the two sample NMR control method, the resonance signal produced by the control sample controls the magnetic field both during measurement and sample exchange. However, even though a special stabilization control device is eliminated, it is, nevertheless, impossible to place both samples in the same position in the magnetic field. As a result, the two samples are subjected to slightly different magnetic field intensities and, therefore, the high degree of stabilization required for high resolution NMR instruments is unobtainable.

We have invented an apparatus which in connection with a gyromagnetic resonance instrument provides a higher stabilized magnetic field during sample exchange. We have accomplished this amazing degree of stabilization by utilizing a control sample that occupies the same region as the analyzed sample during exchange of said sample. Our apparatus insures a very high resolution and a highly stabilized magnetic field.

Generally, when the sample analyzed is exchanged, the control sample is automatically positioned within the same region previously occupied by the sample analyzed. The control sample is subjected to resonance conditions utilizing a different circuit voltage which may be used to control the audio frequency, radio frequency or magnetic field of the NMR apparatus to compensate for deviations between the control sample and the reference sample within or with the sample analyzed. The system is automatically placed back on a control effectuated by the internal reference sample upon the instrument being supplied with the new sample to be analyzed. The other advantages of our apparatus or system will become more apparent by reading the following detailed specification in connection with the accompanying drawings, in which:

FIG. 2 is a sectional view of the probe member for automatic sample exchange;

FIG. 3 is a front view of the protruding cylindrical part of the probe member shown in FIG. 2;

FIG. 4 is a sectional view taken along the line IV—IV of FIG. 3;

FIG. 5 is a plan view of the movable disc shown in FIG. 2;

FIGS. 12 and 13 are waveforms of an alternative output voltage of the dampened oscillation circuit.

Figure 1:
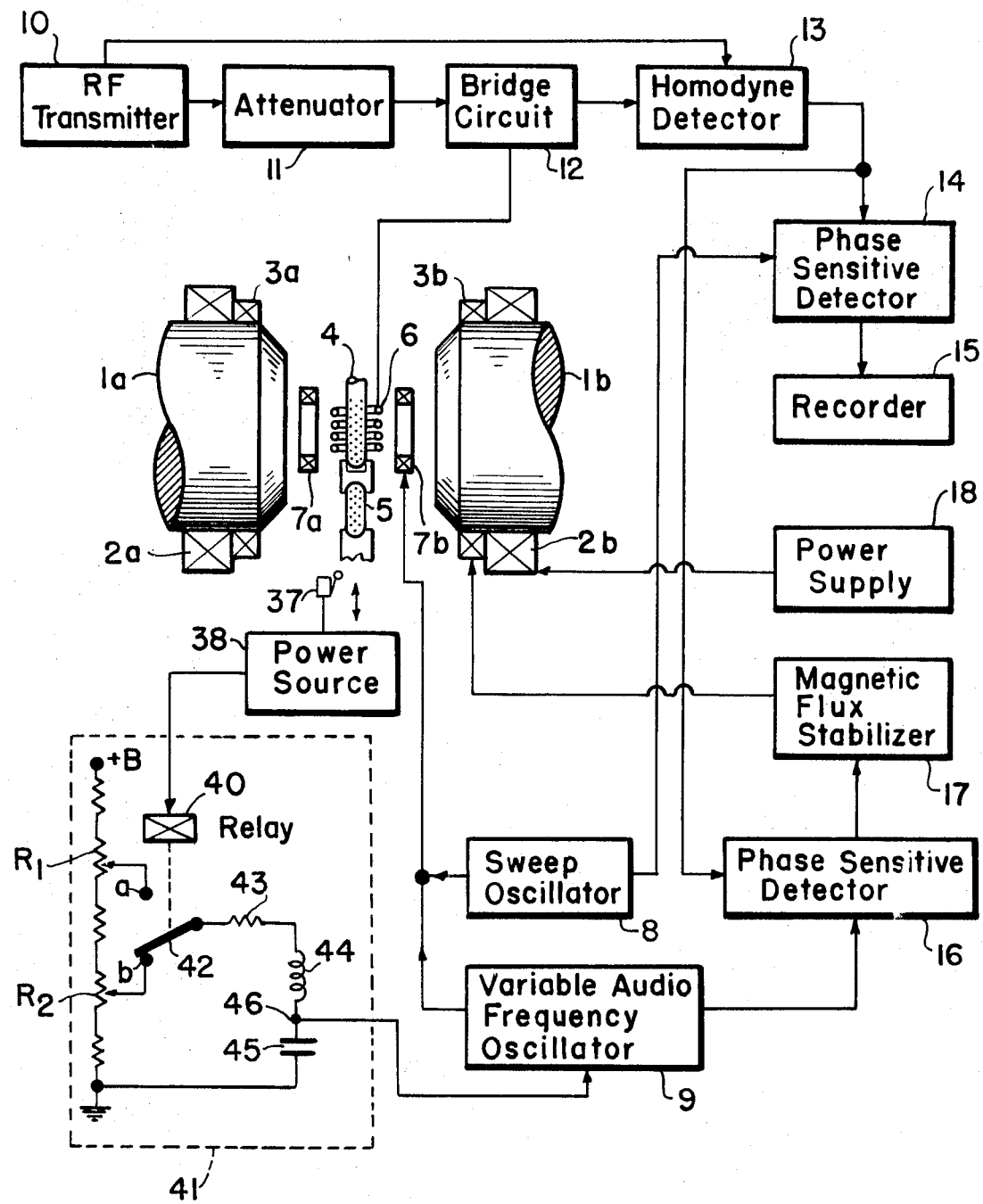
FIG. 1 is a block diagram of the gyromagnetic resonance apparatus utilizing our automatic control.

Referring to FIG. 1, magnetic pole pieces 1a and 1b provide the polarizing magnetic field. Coils 2a and 2b are used to excite the magnet and coils 3a and 3b are used for stabilizing magnetic flux. Excitation coils 2a and 2b are activated by power supply 18 and magnetic flux stabilizer coils 3a and 3b are connected to a magnetic flux stabilizer 17 for stabilizing the magnetic pole pieces.

A sample tube 4, containing a mixture of a sample to be measured and an internal reference sample, is positioned in the gap provided between pole pieces 1a —and 1b and is surrounded by radio frequency coil 6 wound on a bobbin of a probe member 20 (see FIG. 2).

Another tube 5, containing the control sample, is also arranged in the pole piece gap and held secure by the probe member holder. Both sample tubes 4 and 5 are arranged on the same axis in the polarizing magnetic field.

When sample tube 4 is removed from the probe member, sample tube 5 is automatically positioned within the radio frequency coil 6 by means of a spring 26 (FIG. 2). Two modulation coils 7a and 7b are positioned on either side of probe member 20 to modulate the polarizing magnetic field.

Two low frequency currents, one from a sweep oscillator 8 having an angular frequency $\omega_{ms}$ and the other from a variable audiofrequency oscillator 9 having an angular frequency $\omega_{m1}$ or $\omega_{m2}$ are fed to the modulation coils 7a and 7b. The variable audiofrequency oscillator 9 feeds modulation frequency $\omega_{m1}$ to modulation coils 7a and 7b when the sample in tube 4 is being measured and modulation frequency $\omega_{m2}$ when sample 4 is removed from the probe member.

When the resonance condition of sample 4 is satisfied by an output signal, a resonance signal is produced at the output of bridge circuit 12 and this in turn is transmitted to a homodyne detector 13. Simultaneously therewith, another output signal of the same frequency as the output signal fed to the radio frequency coil 6 is fed from the r–f transmitter 10 to the homodyne detector 13 to select only the audiofrequency components $\omega_{m1}$ and $\omega_{ms}$ included in the resonance signal. The resultant output signal from the homodyne detector is then fed to a phase sensitive detector 14. Simultaneously therewith, the audiofrequency signal from sweep oscillator 8 is fed into the sensitive detector as a reference signal after passing through a phase shifter (not shown). As a result, the audiofrequency component $\omega_{m1}$ of the resonance signal is eliminated and the absorption waveform can be obtained from the $\omega_{ms}$ component signal.

The output signal from the phase sensitive detector 14 is recorded by a recorder 15.

Simultaneously, part of the output signal from the homodyne detector 13 is fed to a phase sensitive detector 16 to which the audiofrequency output signal from the audiofrequency oscillator 9 is also fed as a reference signal for obtaining a dispersion waveform of the $\omega_{m1}$ component signal of the internal reference sample. The output signal from the phase sensitive detector 16 is fed to a magnetic flux stabilizer 17 to control the current supplied to the magnetic flux stabilizer coils 3a and 3b. As a result, the polarizing magnetic field is always maintained at the resonance condition of the reference sample.

The NMR control system in conjunction with sample 4 operates to maintain optimum polarizing magnetic field stabilization.

To summarize, the polarizing magnetic field is controlled by means of a resonance signal produced by the reference sample mixed with the sample being measured. This control automatically changed from a reference sample for controlling the polarizing magnetic field to the resonance signal produced by the control sample, when sample 4 is removed from the probe member.

The control sample is automatically inserted into the r–f coil and remains there until a new sample 4 is placed in the probe member, at which time, the control sample is automatically returned to its original position.

Referring to FIG. 2, probe member 20 is provided with upper and lower frames 19a and 19b respectively. A hole is machined about the center line of each frame and an indent 21 is formed on the lower frame about the machined hole. A plate 22 is mounted on the upper surface of the lower frame so as to cover the indent 21.

The upper and lower ends of bobbin 23 are secured to the inner wall of the machined hole in the upper frame 19a and plate 22 respectively. The radio frequency coil 6, shown in FIG. 1, is wound about the bobbin. The upper end of a cylinder 24 having a base 24a is secured to the lower frame 19b via the machined hole.

Elongated slits 25a and 25b (see FIG. 3) are provided in the wall of the cylinder 24. A disc 27 is provided with two protruding pieces 27a and 27b and is attached to spring 26. The two protruding pieces extend to the outside of cylinder 24 through the elongated slits 25a and 25b and arranged so as to slide freely along the length of the slits in accordance with the compression and expansion of spring 26.

A cylindrical holder 28 is secured to disc 27 in cylinder 24, and control sample tube 5 is positioned to fit in the recess provided in the upper portion of the cylindrical holder.

Sample tube 4 is mounted on control sample tube 5 via a spacer 29 so as to be surrounded by the bobbin 23. In this way, both sample tubes lie along the same axis in the magnetic field. A U-shaped holder 30 is secured to the outer surface of the cylinder 24 by means of two protruding pieces 30c and 30d. Brackets 30a and 30b are provided to link the protruding pieces to protruding pieces 27a and 27b forming part of the disc 27. The brackets being jointed by U-shaped coupler 31 are connected to an L-shaped operation bar 32, which extends through the lower and upper frames 19b and 19a respectively, to the exterior of probe member 20. A coil spring 33 is wound round the operation bar 32 between the two frames, the lower end of which is secured to lower frame 19b.

A stopper 34 is attached to the upper end of the spring. The spring, thus positioned and in cooperation with brackets 30a and 30b holds operation bar 32 in the position indicated in FIG. 3. This position is changed when the operation bar is depressed. A control stopper 35 is secured to operation bar 32 and flush against the under surface of the lower frame 19b. A pushbutton 36 is attached to the upper end of said bar.

A microswitch 37, FIG. 1, which is deactivated or activated according to the respective up and down movement of holder 28, is connected to the cylinder 24 at a suitable position along the cylinder wall.

Switch 37, when activated, brings a relay 40 (see FIG. 1) into operation. When sample tube 4 is inserted in the bobbin 23, the magnetic field is controlled by means of the resonance signal produced by the reference sample contained in the sample to be measured. On the other hand, when the sample tube is removed, pushbutton 36 is depressed, brackets 30a and 30b are moved in the direction indicated by arrow 39 (see FIG. 3), the protruding pieces 30c and 30d forming part of the U-shaped holder 30 acting as the center of movement. Accordingly, the protruding pieces 27a and 27b forming part of disc 27 are detached from brackets 30a and 30b with the result that cylinder 28 is pushed up by spring 26 thereby positioning the control sample tube 5 into bobbin 23. This activates microswitch 37 which deenergizes relay 40. Circuit 41 enclosed by the dotted line in FIG. 1 represents a dampened oscillation or activation circuit.

Figure 6:
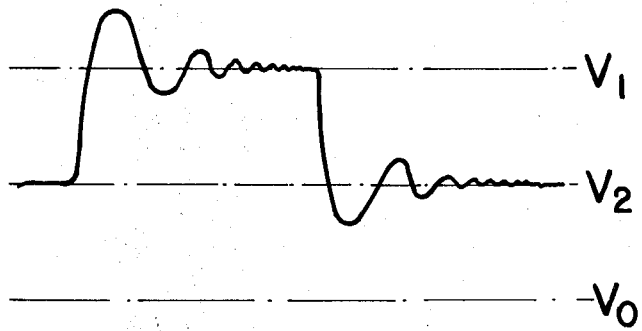
FIG. 6 is a waveform of one output voltage of the dampened oscillation circuit used in our invention.

A voltage applied to the +B terminal is divided by variable resistors $R_1$ and $R_2$; the divided voltage is applied to terminals a and —b respectively. A relay switch 42 is grounded through resistor 43, coil 44 and capacitor 45 to form the dampened oscillation circuit. Junction point 46 located between coil 44 and capacitor 45 is connected to the variable audiofrequency oscillator 9. When the relay 40 becomes deenergized, relay switch 42 is connected to terminal b, at which time the voltage at the junction point 46 drops from $V_1$ and $V_2$, following the dampened oscillation under the proper time constant of the circuit as shown in FIG. 6 where the values $V_1$ and $V_2$ depend on the values of resistors $R_1$ and $R_2$. Voltage $V_2$ is then applied to the audiofrequency oscillator 9 thereby changing the oscillation frequency of the oscillation from $\omega_{m1}$ to $\omega_{m2}$, where $\omega_{m1}$ indicated the modulation frequency corresponding to the resonance frequency of the reference sample contained in the sample to be measured and $\omega_{m2}$ indicates the modulation frequency corresponding to the resonance frequency of the control sample at the same magnetic field intensity. As a result, the polarizing magnetic field is modulated by a modulation signal having a frequency $\omega_{m2}$ when the control sample is inserted in the bobbin 23.

Simultaneously, the resonance signal produced by the control sample is fed into the phase sensitive detector 16 via bridge circuit 12 and the homodyne detector 13, and the output signal from the variable audiofrequency oscillator 9 is fed into the phase sensitive detector as a reference signal. The signal detected by the phase sensitive detector 16 is then fed into magnetic flux stabilizer coils 3a and 3b via the magnetic flux stabilizer 17. As a result, the polarizing magnetic field is controlled by the resonance signal produced by control sample 5.

When sample tube 4 is inserted into bobbin 23, brackets 30a and 30b hook onto the protruding pieces 27a and 27b, thus securing the tube firmly in place. At the time, control sample tube 5 and the cylindrical holder 28 are forced down against spring 26 activated microswitch 37 and energizing relay 40. As a consequence, relay switch 42 is switched from terminal b to terminal a by means of relay 40 and the oscillation voltage increases to $V_1$(see FIG. 6). THis output voltage is then applied to the variable audiofrequency oscillator 9. Accordingly, the oscillation frequency of the oscillator changed from $\omega_{m2}$ to $\omega_{m1}$.

Figure 8:
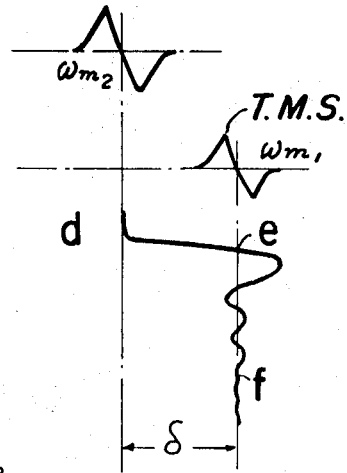
FIG. 7 and 8 show the frequency variations of the variable audio frequency oscillator.
Figure 7:
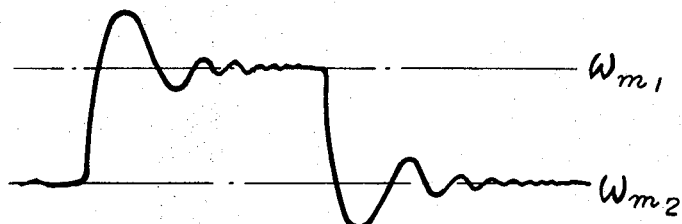

Even if the resonance frequency of sample 4 is different from that of the control sample, it is possible to change from the control sample resonance signal to internal reference sample resonance signal because variable resistors $R_1$ and $R_2$ are adjusted so that the difference between $\omega_{m1}$ and $\omega_{m2}$ is equal to the difference $\delta$ between the said two resonance frequencies (see FIG. 8).

The frequency variations of the variable audiofrequency oscillator 9 are shown in FIG. 8 when the reference sample resonance signal NMR control is changed to measuring sample resonance signal NMR control. In this case, tetramethyl silan, TMS, was used as the internal reference sample and water containing a suitable paramagnetic metal ion was used as the control sample.

FIG. 8 furthermore shows that the modulation frequency from the variable audiofrequency oscillator 9 beings to change at point d —when the sample tube 4 is inserted in the bobbin 23 and varies as shown.

The internal reference sample resonance signal automatically begins to control the magnetic field when the modulation frequency variations pass the resonance point of the TMS signal at a suitable speed. Moreover, since the values of resistor 43, coil 44 and capacitor 45 are such that the modulation frequency can be rapidly varied, reference signals produced by the sample to be measured do not control the magnetic field even if they appear during the variation of the modulation frequency from $\omega_{m2}$ to $\omega_{m1}$; that is, during the variations between point d and e in FIG. 8.

During the time the modulation frequency varies between point e and f, the reference sample resonance signal definitely controls the magnetic field because the variation speed of the modulation frequency, periodically and decreasingly passes the resonance point of the TMS signal, gradually decreases. On the other hand, the resonance signal produced by the sample to be measured is fed into the phase sensitive detector 14 via the bridge circuit 12 and the homodyne detector 13 and the output signal from the sweep oscillator 8 is fed into the phase sensitive detector as a reference signal. The output signal from the detector is then recorded by recorder 15.

Figure 9:
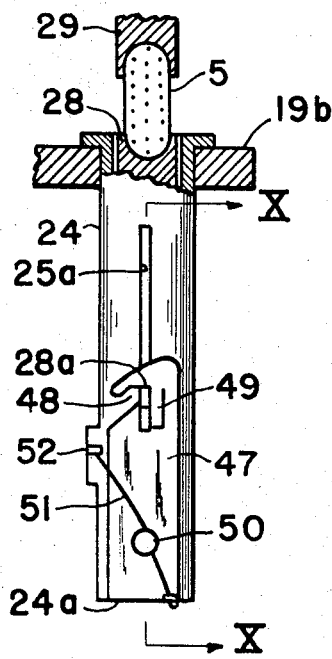
FIG. 9 is the front view of the protruding cylindrical part of another embodiment of the probe member in accordance with our invention.
Figure 10:
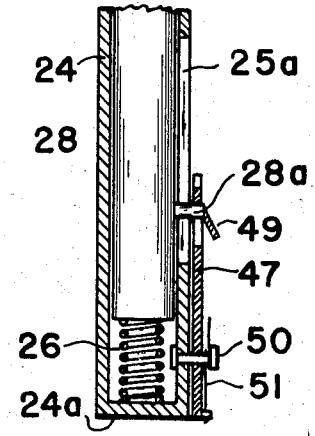
FIG. 10 is a sectional view of FIG. 9 taken along the line X—X.

FIGS. 9 and 10 show another embodiment of the cylinder 24. In this arrangement, cylindrical holder 28 is equipped with a single protruding piece 28a extended to the outside of cylinder 24 via the elongated slit 25a. A "nail" plate 47 provided with a notch 48 is rotatably fitted to the exterior of cylinder 24 by means of pin 50, said notch being designed to latch onto protruding piece 28a.

Moreover, an inclined hook 49 is cut into "nail" plate 47 so as to lie along the side of the notch 48. A spring 51, one end of which is fastened to the base of the cylinder 24, the other end being fixed to a stopper 52 formed on the exterior of cylinder 24, is looped around the pin 50.

By means of this arrangement, the "nail" plate 47 can rotate in the clockwise direction, thus causing the upper part of the plate to be pushed upwards. Accordingly, notch 48 latches onto protruding piece 28a as shown in FIG. 9 and by so doing, sample tube 4 is held firmly in the radio frequency coil 6. If the sample tube 4 is slightly depressed, the cylindrical holder 28 will be pushed down against spring 26. At the same time protruding piece 28a is separated from notch 48 and proceeds to move downwards along the side of the inclined hook 49. When the base of said hook is higher than protruding piece 28a, the "nail" plate rotates in the clockwise direction until it comes up against stopper 52. Accordingly, piece 28a is inserted in the gap between the inclined hook 49 and the cylinder 24, thus allowing the cylindrical holder 28 to be pushed up when sample tube 4 is removed from the bobbin 23. Thereafter, piece 28a moves in the upwards direction so as to come into contact with the base of the hook and in so doing, pushes up "nail" plate 47. Piece 28a then detaches itself from the plate and moves upward along the elongated slit 25a until it reaches the top.

When a new sample tube including another sample to be measured is inserted into the bobbin 23, the cylindrical holder 28 is pushed down against spring 26 and piece 28a moves downwards along the elongated slit 25a. As soon as the protruding piece comes into contact with the "nail" plate 47, the plate rotates in the clockwise direction about pin 50. This is possible because the upper edge of "nail" plate 47 is curved.

When protruding piece 28a reaches the base of the elongated slit 25a, the protruding piece together with the cylindrical holder 28 is forced upwards by means of the spring 26 as soon as the new sample tube is released. When piece 28a reaches the opening of the notch 48, the "nail" plate 47 rotates in the counterclockwise direction so that the protruding piece enters the notch, thereby locking cylindrical holder 28.

Figure 11:
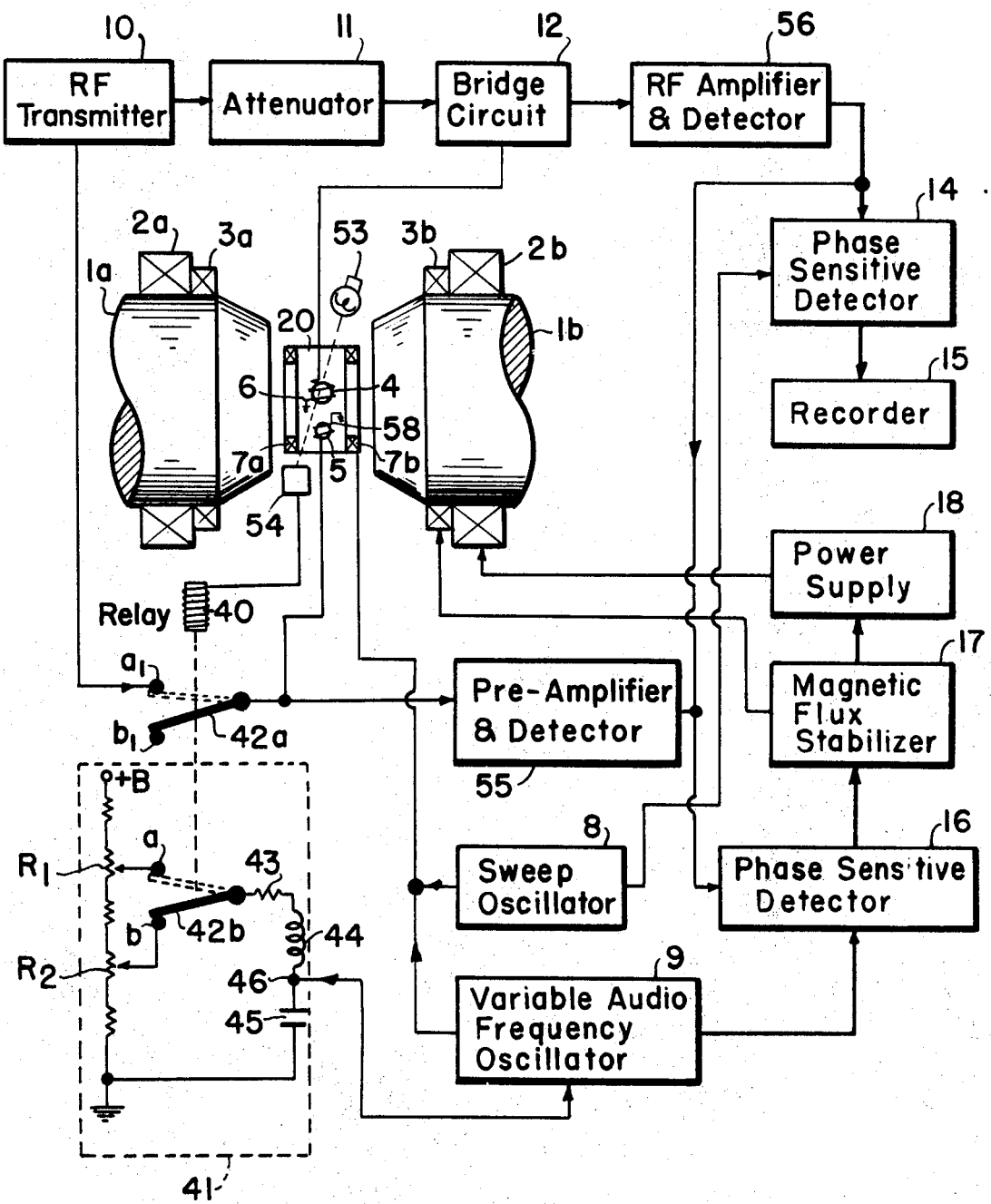
FIG. 11 is a block diagram of another embodiment of the gyromagnetic resonance apparatus in accordance with our invention utilizing two r–f magnetic fields.

FIG. 11 shows another embodiment of the present invention in which two r–f coils are provided for the sample to be measured and the control sample respectively.

A beam of light from a light source 53 is detected by a photodetector 54 after passing through sample tube 4. Upon removal of the tube from probe member 20, the light intensity suddenly increases, thereby energizing relay 40 connected to the photodetector 54. The relay is provided with two relay switches 42a and 42b, which are so designed that when the relay operates, relay switch 42a is connected to terminal $a_1$ and relay switch 42b is connected to the terminal a.

Terminal $a_1$ is in turn connected to the r–f transmitter 10 while its connecting relay switch 42 is connected to the radio frequency coil 58 which surrounds the control sample and to phase sensitive detector 16 via a preamplifier and detector 55.

On the other hand, the output of bridge circuit 12 is connected to an r–f amplifier and detector 56, the output of which is fed to the phase sensitive detectors 16 and 14.

When the sample tube 4 is inserted in radio frequency coil 6, the resonance signal produced by the sample to be measured is recorded by recorder 15 after passing through the bridge circuit 12, r–f amplifier and detector 56, and phase sensitive detector 14. Due to the presence of sample tube 4 in the radio frequency coil 6, the light beam from light source 53 is interrupted and relay 40 is deenergized because the photodetector 54 ceases to detect the light beam. Consequently, the relay switch 42a is connected to terminal $b_1$ and the control sample becomes inoperative. At the same time, relay switch 42b is connected to the terminal b, thus causing the output voltage of the dampened oscillation circuit 41 to drop to $V_1$. As a result, oscillator 9 changes from $\omega_{m2}$ to $\omega_{m1}$. The $\omega_{m1}$ audio frequency component of the resonance signal of the reference sample contained in the sample to be measured is fed to the phase sensitive detector 16 simultaneously with the output signal of the variable frequency oscillator 9, and the output of phase sensitive detector 16 is connected to the magnetic flux stabilizer 17 so as to control the polarizing magnetic field.

When sample tube 4 is removed from bobbin 23, relay 40 is once again energized because the light beam from the light source 53 is detected by photodetector 54. As a result, relay switches 42a and 42b are switched from the terminals $b_1$ and b to the terminals $a_1$ and a respectively, and control sample once more controls the magnetic field. The radio frequency signal from the r–f transmitter 10 is now fed to the radio frequency coil 58 via the relay switch 42a, and the resonance signal produced by the control sample is fed into the phase sensitive detector 16 via preamplifier and detector 55. The output voltage of the dampened oscillation circuit 41 is changed from $V_1$ to $V_2$ due to the above-mentioned switch changeover by relay switch 42b from terminal b to terminal a, so that the oscillation frequency of the variable audiofrequency oscillator 9 changes from $\omega_{m1}$ back to $\omega_{m2}$. The output signal from the oscillator is now fed into the phase sensitive detector 16 which detects the signal from preamplifier and detector 55 by comparing it with the output signal from the variable audiofrequency oscillator 9 used as a reference signal. The output signal of the phase sensitive detector 16 is fed to magnetic flux stabilizer coils 3a and 3b and the power supply 18 via magnetic flux stabilizer 17 so as to control the magnetic field.

Although FIG. 6 typifies the output voltage of the dampened oscillation circuit 41 with respect to both embodiments, the voltage can be gradually changed from $V_1$ to $V_2$ as shown in FIG. 12. Alternatively, the voltage can be changed to a value g designed to overshoot the voltage $V_2$ as shown in FIG. 13 and then gradually approaches to the voltage $V_2$.

According to our invention, the magnetic field can be automatically and effectively stabilized by means of the NMR control method based on the change from the sample to be measured to the control sample and vice versa, thus improving the stability appreciably.

We claim:

1. In a gyromagnetic resonance apparatus having a polarizing magnetic field and a radio frequency magnetic field for resonating an unknown sample positioned within said fields, an improvement therein for maintaining field/frequency control during exchange of unknowns comprising:
    A. means for modulating the polarizing magnetic field with an audiofrequency magnetic field;
    B. means for controlling the frequency of the modulating means having first and second audiofrequency outputs;
    C. a probe member positioned within the polarizing magnetic field for holding an unknown sample mixed with an internal reference sample within the radio frequency magnetic field and an external control sample adapted to occupy the space occupied by said unknown sample mixed with the internal reference sample when it is removed from the probe;
    D. means for releasing the unknown sample and for positioning the control sample within the radio frequency magnetic field, said means provided with an activation circuit for selecting either the first or second frequency output of the control means, wherein the first output controls the modulating means when said unknown and reference samples are positioned in the radio frequency magnetic field to resonate said internal reference sample and the second output controlling the modulating means when the external control sample is positioned within the radio frequency magnetic field; and E. means responsive to an error signal created by a change in degree of resonance caused by fluctuations relative to the resonance conditions of the internal reference sample during sample analysis and the external control sample during sample changing for maintaining the field/frequency intensity ratio.

2. The improvement set forth in claim 1 wherein said means for modulating the polarizing magnetic field comprises a set of coils controlled by a variable audio oscillator and a sweep oscillator, said audio oscillator having two frequency outputs and said sweep oscillator providing a sweep signal to resonate the unknown sample, one of said outputs being applied to the set of coils for modulating the polarizing magnetic field when the unknown sample is being measured, the other being applied to the said set of coils during sample exchange.

3. The improvement set forth in claim 1 wherein said probe member comprises:
  A. an upper and lower cylinder coaxially positioned, said upper cylinder having about its exterior an RF coil which produces a radiofrequency magnetic field;
  B. a control sample and holder therefor positioned in the lower cylinder and adapted for movement into the upper cylinder within the radiofrequency field;
  C. an unknown sample holder in the upper cylinder within the radiofrequency field and spaced apart from the control sample; and
  D. means for moving the control sample into the upper cylinder within the radiofrequency field when an unknown sample is removed.

4. The improvement set forth in claim 1 wherein said probe member comprises:
  A. an upper and lower spaced apart frame having coaxial openings therein;
  B. a bobbin positioned between said frames and having a coaxially aligned passageway in communication with said openings, said bobbin having positioned about its exterior a radio frequency coil;
  C. a cylinder depending from the lower frame in communication with the passageway and openings and having a base at its depending end and including two oppositely positioned slits extending through the cylinder;
  D. a cylindrical holder positioned within the cylinder and having an end with protrusions extending through the slits and at its other end containing the control sample;
  E. a spring positioned between the base and the holder end with the protrusions, said spring biasing said holder towards the bobbin passageway;
  F. a spacer mounted on top of said control sample;
  G. an unknown sample mounted on the spacer and within the bobbin and radio frequency coil;
  H. a pivotable hook means for holding said holder within the cylinder against the spring; and
  I. means for pivoting the hook to release the holder and force the control sample within the bobbin and the radio frequency coil.

5. The improvement set forth in claim 1 wherein the activation circuit of the release means includes:
  A. a divided variable resistor connected to a power supply at one end and grounded at the other;
  B. a switch connecting either of two points on the divided resistor with a third point;
  C. a resistor, coil and capacitor connected in series to the third point of the switch and to the ground of divided resistor;
  D. a relay for positioning the switch at either of said two points, said relay operable by said release means; and
  E. a tap between the coil and capacitor connected to said control means whereby the voltage taken from either of two points will select either the first or second output of said control means.

6. In a gyromagnetic resonance apparatus having a polarizing magnetic field and a radio frequency magnetic field for resonating an unknown sample positioned within said fields, an improvement therein for maintaining field/frequency control during sample exchange of unknown samples comprising:
  A. means for modulating the polarizing magnetic field with an audiofrequency magnetic field;
  B. means for controlling the modulating means having first and second audiofrequency outputs;
  C. a probe member positioned within the polarizing magnetic field for holding an unknown sample containing a internal reference sample and a control sample;
  D. a transmitter means for applying RF magnetic fields to said samples;
  E. switching means responsive to sample changes for operating an activation circuit;
  F. an activation circuit for selecting either the first or second frequency output of the control means wherein the first frequency output and the RF frequency field cause resonance of the internal reference sample and the second frequency output and RF frequency field cause resonance of said control sample;
  G. means responsive to an error signal created by a change in degree of resonance caused by fluctuations relative to the resonance conditions of the internal reference sample during sample analysis and the external control sample during sample changing for maintaining the field/frequency intensity ratio; and wherein said switching and activation circuit include:
  H. a photoelectric detector for detecting the presence of the unknown sample in the probe member;
  I. a relay connected to said detector;
  J. A divided variable resistor connected at one end to a power supply and grounded at its other;
  K. a first and second switch, said first switch for connecting and disconnecting the radio frequency to the control sample to create a radiofrequency magnetic field about said sample, said second switch connecting two points on the resistor;
  L. a resistor, coil and capacitor connected in series to the third point of said second switch and to the divided resistor ground; and
  M. a tap between the coil and capacitor connected to said control means whereby the voltage taken from either said two points will select either the first or second output frequency of said control means.

7. A gyromagnetic resonance apparatus comprising: sweep
  A. a pair of spaced apart magnets for creating a polarizing magnetic field and having a power supply and magnetic flux stabilizer coils;
  B. an RF transmitter coupled through a bridge circuit to an RF coil for creating an RF magnetic field;
  C. a pair of modulation coils for modulating said polarizing magnetic field with an audiofrequency magnetic field and a sweeping magnetic field;
  D. a probe member positioned between said modulation coils, said probe holding the unknown sample mixed with a reference sample within the RF coil and a control sample adapted to be moved within the space previously occupied by the unknown sample when the unknown sample is removed;
  E. a sweep oscillator connected to the modulation coils for providing the sweeping magnetic field resonating said unknown and a variable oscillator having a first and second frequency output providing audiofrequency magnetic fields that cooperate with the Rf magnetic field to resonate the internal reference and external control samples respectively, connected to the modulation coil, said resonance causing an output from said bridge circuit having components corresponding to the frequency of the sweep oscillator and the first and second frequencies;
  F. a means for positioning the unknown sample within the RF field and for releasing the unknown sample and for positioning the control sample within the space previously occupied by said unknown in the RF field within the probe, said means including a circuit means connected to the variable oscillator for switching the oscillator to the first frequency output when the unknown sample is positioned within the RF field and for switching to the second frequency outputs of said oscillator when said external control sample is positioned within the RF field;

G. a homodyne detector connected to said bridge circuit and RF transmitter for detecting only said first and second frequency output components and sweep frequency output component;

H. a first phase sensitive detector connected to said homodyne detector and sweep oscillator for eliminating said first and second frequency output to form an absorption waveform of the sweep oscillator component of the resonance signal of the unknown sample;

I. a recorder for recording said waveform;

J. a second phase sensitive detector connected to said homodyne detector and variable oscillator for forming the dispersion waveform of said first and second frequency output; and K. a magnetic flux stabilizer connected to said second phase detector and to said magnetic flux stabilization coils responsive to an error signal being the output of the second phase sensitive detector and caused by fluctuations from the resonance conditions in the control sample and internal reference sample for stabilizing said polarizing magnetic field.

8. A gyromagnetic resonance apparatus comprising:

A. a pair of spaced magnets for creating a polarizing magnetic field;

B. an RF transmitter coupled through a bridge circuit for a first and second RF coil for creating two RF magnetic fields;

C. a pair of modulation coils for modulating the polarizing magnetic field with an audiofrequency magnetic field and a sweeping magnetic field;

D. a probe member positioned between the modulating coils, said probe arranged to hold an unknown sample mixed with a reference sample within said first RF coil and a control sample within said second RF coil;

E. a sweep oscillator for resonating said unknown sample connected to the modulation coils and a variable oscillator having a first and second frequency output providing alternating magnetic fields that cooperate with the RF magnetic fields to resonate the internal reference sample and external control sample respectively, connected to said modulation coils, said resonances causing an output from said bridge circuit having components corresponding to the frequency of the sweep oscillator and the first and second frequencies; —

F. a first phase sensitive detector connected to said bridge for detecting an audio frequency component of the resonance signal of said unknown sample to which the audiofrequency from the sweep oscillator is applied as a reference signal;

G. a photoelectric detector and light source for detecting the presence of the unknown sample in the probe;

H. a relay connected to said photoelectric detector for actuating a first switch to connect the RF transmitter and second RF coil when the unknown sample is removed, a circuit means connected to the variable oscillator for switching the oscillator to said first frequency output when the unknown sample is positioned within the first RF coil and for switching to the second frequency output when said unknown sample is removed;

I. a preamplifier and detector connected to said first switch for detecting the resonance signals of the control sample; and J. a second phase sensitive detector connected to said detector for selecting only the audiofrequency component of the resonance signals and a magnetic flux stabilizer responsive to an error signal being the output of the second phase sensistive detector created by a change in degree of resonance caused by fluctuations from the resonance conditions in the control sample and internal reference sample for controlling the polarizing magnetic field.

UNITED STATES PATENT OFFICE
CERTIFICATE OF CORRECTION

Patent No. 3,609,519  Dated September 28, 1971

Inventor(s) Toshimasa Seki et al.

It is certified that error appears in the above-identified patent and that said Letters Patent are hereby corrected as shown below:

Claim 4 - Column 7 Line 41
--depending-- should read --nondepending--.
Claim 7 - Column 8 Line 44 Delete the word --sweep--.

Signed and sealed this 22nd day of February 1972.

(SEAL)
Attest:

EDWARD M. FLETCHER, JR.          ROBERT GOTTSCHALK
Attesting Officer                Commissioner of Patents